US009834638B2

(12) United States Patent
Sounik et al.

(10) Patent No.: US 9,834,638 B2
(45) Date of Patent: Dec. 5, 2017

(54) PROCESS FOR PREPARING RIGID POLYISOCYANURATE FOAMS USING NATURAL-OIL POLYOLS

(75) Inventors: David F. Sounik, Bethel Park, PA (US); Steven L. Schilling, Pittsburgh, PA (US); Don S. Wardius, Pittsburgh, PA (US); Edward E. Ball, Weirton, WV (US)

(73) Assignee: Covestro LLC, Pittsburgh, PA (US)

( * ) Notice: Subject to any disclaimer, the term of this patent is extended or adjusted under 35 U.S.C. 154(b) by 2471 days.

(21) Appl. No.: 12/132,722

(22) Filed: Jun. 4, 2008

(65) Prior Publication Data

US 2009/0306236 A1     Dec. 10, 2009

(51) Int. Cl.
| | |
|---|---|
| C08G 18/02 | (2006.01) |
| C08G 18/48 | (2006.01) |
| C08G 18/09 | (2006.01) |
| C08G 73/06 | (2006.01) |
| C08J 9/14 | (2006.01) |
| C08G 101/00 | (2006.01) |

(52) U.S. Cl.
CPC ....... *C08G 18/4891* (2013.01); *C08G 18/092* (2013.01); *C08G 18/4804* (2013.01); *C08G 73/0655* (2013.01); *C08J 9/141* (2013.01); *C08G 2101/005* (2013.01); *C08G 2101/0025* (2013.01); *C08G 2101/0058* (2013.01); *C08J 2205/10* (2013.01); *C08J 2105/02* (2013.01); *C08J 2375/04* (2013.01)

(58) Field of Classification Search
CPC .................................................. C08G 18/092
USPC ........................................ 521/117, 137, 170
See application file for complete search history.

(56) References Cited

U.S. PATENT DOCUMENTS

| | | | |
|---|---|---|---|
| 3,047,540 A | | 7/1962 | Merten et al. |
| 3,164,557 A | | 1/1965 | Merten et al. |
| 3,909,465 A | * | 9/1975 | Wiedermann et al. ....... 521/157 |
| 4,546,120 A | * | 10/1985 | Peerman et al. .............. 521/159 |
| 4,644,048 A | * | 2/1987 | Magnus et al. ............... 528/176 |
| 4,758,602 A | * | 7/1988 | Trowell ....................... 521/109.1 |
| 4,897,429 A | * | 1/1990 | Trowell et al. ................ 521/157 |
| 5,075,417 A | * | 12/1991 | Trowell et al. ................ 528/272 |
| 5,112,877 A | * | 5/1992 | Barker et al. ................. 521/110 |
| 5,312,848 A | * | 5/1994 | Klapper et al. ............... 521/172 |
| 5,399,728 A | * | 3/1995 | Cooper .......................... 554/149 |
| 5,610,205 A | * | 3/1997 | Yang et al. .................... 522/102 |
| 5,886,062 A | * | 3/1999 | Dietrich et al. .............. 521/167 |
| 5,910,515 A | | 6/1999 | Chittolini |
| 5,922,779 A | * | 7/1999 | Hickey .......................... 521/114 |
| 6,071,977 A | | 6/2000 | Austin et al. |
| 6,133,329 A | | 10/2000 | Shieh et al. |
| 6,359,022 B1 | | 3/2002 | Hickey et al. |
| 6,364,925 B1 | * | 4/2002 | Markusch et al. ........... 71/64.07 |
| 6,433,121 B1 | * | 8/2002 | Petrovic et al. ................... 528/1 |
| 6,664,363 B1 | * | 12/2003 | Faunce ....................... 528/295.5 |
| 6,686,435 B1 | * | 2/2004 | Petrovic et al. ................ 528/44 |
| 7,566,406 B2 | * | 7/2009 | Gilder ......................... 252/182.2 |
| 2005/0014857 A1 | * | 1/2005 | Heinemann et al. ......... 521/155 |
| 2005/0113470 A1 | * | 5/2005 | Zhu et al. ........................ 521/50 |
| 2006/0041156 A1 | * | 2/2006 | Casper et al. ................. 554/138 |
| 2006/0229375 A1 | * | 10/2006 | Hsiao et al. ................... 521/172 |
| 2006/0251881 A1 | * | 11/2006 | Gilder ......................... 428/317.1 |
| 2007/0173626 A9 | | 7/2007 | Geiger et al. |
| 2008/0114086 A1 | * | 5/2008 | Lorenz et al. .................. 521/88 |
| 2008/0161441 A1 | * | 7/2008 | Wang et al. .................. 521/174 |
| 2009/0312447 A1 | | 12/2009 | Hickey |

FOREIGN PATENT DOCUMENTS

| | | |
|---|---|---|
| GB | 1104394 | 2/1968 |
| JP | 2007269849 A | 10/2007 |
| WO | 2004005365 A1 | 1/2004 |

OTHER PUBLICATIONS

Uldis Stirna et al, Structure and Properties of Polyurethane Foams Obtained from Rapeseed Oil Polyols, Proceedings of the Estonian Academy of Sciences, Chemistry 2006, 55(2), pp. 101-110, Estonian Academy Publishers.
Javni, I. et al, Soybean-Oil-Based Polyisocyanurate Rigid Foams, Journal of Polymers and the Environment, 2004, 12(3), pp. 123-124.

* cited by examiner

*Primary Examiner* — Peter F Godenschwager
(74) *Attorney, Agent, or Firm* — Donald R. Palladino; Robert S. Klemz; Lyndanne M. Whalen

(57) ABSTRACT

The present invention provides a process for producing a rigid polyisocyanurate foam involving reacting at an isocyanate index of from about 175 to about 400, a polyisocyanate with at least one natural-oil polyol containing at least about 35 wt. %, based on the weight of the polyol, of natural oil, having a hydroxyl number from about 175 to about 375 and a hydroxyl functionality of about 2.0 to about 2.8, in the presence of a blowing agent and optionally, in the presence of one or more of surfactants, flame retardants, pigments, catalysts and fillers, wherein the resulting foam has a renewable biobased content of at least 8% by weight. The foams provided by the inventive process possess properties similar to foams produced from petroleum-derived materials and may find use in wall or roof insulation systems. The high biobased content (>8%) may allow wall or roof insulation systems containing these foams to be considered for the U.S. Government's preferred procurement program.

13 Claims, No Drawings

PROCESS FOR PREPARING RIGID POLYISOCYANURATE FOAMS USING NATURAL-OIL POLYOLS

FIELD OF THE INVENTION

The present invention relates, in general, to foams and more specifically, to a process for preparing rigid polyisocyanurate foams from renewable natural-oil polyols (NOPs).

BACKGROUND OF THE INVENTION

Rigid foams having polyisocyanurate structures are known in the art to be highly cross-linked polymers. Due to the thermally-stable structure of the isocyanurate ring, polyisocyanurate foams typically possess high temperature resistance, high dimensional stability to heat and excellent flame-resistance properties. When a polyisocyanurate foam is produced using a physical blowing agent with low vapor-phase thermal conductivity, such as a hydrocarbon, hydrofluorocarbon or similar material, the resulting foam can exhibit excellent insulating properties. These two characteristics, excellent high-temperature stability and good insulation properties, account for the widespread use of polyisocyanurate rigid foams as thermal insulation in residential and commercial buildings. When provided with appropriate metal facings, such foams may also be used as insulated exterior roof and wall panels in the commercial building industry. Processes for the production of polyisocyanurate foam are known and have been described, for example, in DE 1,112,285 and in GB 1,104,394, and typically are carried out by reacting organic polyisocyanates with known trimerization catalysts in the presence of materials, such as foam stabilizers, blowing agents and optionally, polyols. The polyisocyanate typically used in such preparations is crude polymeric diphenylmethane diisocyanate (PMDI).

Because of ever-escalating gasoline prices, higher oil usage and static U.S. domestic oil production, increasing emphasis has been placed upon reducing U.S. reliance on imported oil. One route to decreasing this dependence is to find alternative, sustainable raw materials to produce products that currently are made from petroleum-based resources. Among such raw materials are renewable, biobased products made from natural oils obtained from plants. Recognizing this point, in 2002 the U.S. Congress enacted the Farm Security and Rural Investment Act ("FSRIA"). FSRIA awards preferential treatment to biobased materials in the Federal procurement process to increase the U.S. Government's purchase and use of biobased products as one way of helping to lessen the country's need for oil. FSRIA also establishes a procurement preference program for Federal agencies and their contractors and a labeling program to enable the marketing of biobased products. To utilize the highest possible amounts of biobased materials the U.S. Department of Agriculture ("USDA") has established guidelines on the minimum biobased content for several generic groupings of materials that require procurement preference for Federal agencies. For example, in the area of foam insulation for wall systems, a minimum biobased content of 8% by weight is proposed. Therefore, a need exists to increase the biobased content of foam systems used in wall systems to meet the Federal procurement guideline.

As mentioned above, polyisocyanurate foams are produced by polymerizing an isocyanate component using a trimerization catalyst, typically in the presence of a polyester polyol or polyol mixture containing both a polyester polyol and polyether polyol. Except for small amounts of sucrose, sorbitol or glycerine which may be used in preparing the polyether polyol, such foams are made primarily from petroleum-based materials. A number of workers in the art have understood this and attempted, even before the enactment of FSRIA, to provide foams that have a reduced content of petroleum-derived materials, with varying degrees of success.

U.S. Pat. No. 5,910,515, issued to Chittolini, discloses a polyurethane or polyisocyanurate foam derived from a mixture containing a crude isocyanate component and a polyol component which contains all or some of the following in a homogeneous mixture: polyols, catalysts, surfactants, water, flame-retardants, fillers, dyes, pigments, expanding agents (i.e., blowing agents) and a compatibilizing agent for the expanding agents. Among the expanding agents disclosed is a pentane component. The compatibilizing agent is said to be a dialkanolamide derived from oily or fatty substances of vegetable origin and present in an amount of at least 5% by weight relative to the weight of the polyol component. The solubility of the pentane in the polyol component is said to be enhanced by the presence of the dialkanolamide.

Hickey, in U.S. Pat. Nos. 5,922,779 and 6,359,022, describes a polyurethane or polyisocyanurate foam formed by the reaction of a polyisocyanate with a polyester polyol-based resin blend containing an aromatic polyester polyol formed by an inter-esterification reaction between a phthalic acid based material, a hydroxylated material and a hydrophobic material. The mixture also includes a nonionic surfactant and a $C_4$-$C_7$ hydrocarbon blowing agent. The hydrophobic material is said by Hickey to be one or more of castor oil, coconut oil, corn oil, cottonseed oil, linseed oil, olive oil, palm oil, palm kernel oil, peanut oil, soybean oil, sunflower oil, tall oil, tallow and mixtures thereof.

U.S. Pat. No. 6,071,977, issued to Austin et al., details a process for producing a polyurethane or polyisocyanurate by reacting a polyol and a polyisocyanate in the presence of an oil component selected from naturally occurring drying and semi-drying vegetable oils, hydrogenated derivatives or methylated derivatives of those oils, and mixtures thereof, with the oil component being a liquid having a boiling point of at least 175° C. and an organosiloxane copolymer surfactant. Among the oil components disclosed are soybean oil, Lincoln bean oil, Manchurian bean oil, corn oil, safflower oil, palm oil, linseed oil, sesame oil, perilla oil, cottonseed oil, coconut oil, dehydrated castor oil and olive oil.

Shieh et al., in U.S. Pat. No. 6,133,329, describe methods of making aromatic polyester polyols that are said to be suitable for use with hydrocarbon and hydrofluorocarbon blowing agents. Those polyols are made by reacting polyethylene terephthalate dissolved in a solution containing a plurality of glycols with a natural oil. The natural oil is said to react into the polyol backbone at a specific temperature. The polyols are said to exhibit low hydroxyl numbers and low viscosities. Hydrocarbon and hydrofluorocarbon blowing agents are said to be soluble in the polyols of Shieh et al.

WO 2004/005365, in the name of Raceina et al., discloses rigid polyisocyanurate foams which are said to have improved thermal stability that are made with an aromatic polyester polyol or polyol blend having an average hydroxyl functionality of less than about 3.0, a polyisocyanate in a sufficient amount to yield an NCO/OH index of at least about 200, a sugar or carbohydrate having a molecular weight of less than about 2,000 and a blowing agent. The foams of Raceina et al. may also contain flame retardants, stabilizers, and other additives.

While the art above does incorporate biobased materials into polyisocyanurate foams, those materials are present in only minor amounts. One explanation may be that polyols based on natural-oils have a chemical structure that is more aliphatic and less polar than typical polyester polyols, which can lower mechanical and burn properties. Thus, petroleum-based polyether and polyester polyols are still used to produce a majority of polyisocyanurate foams. A need continues to exist in the art for rigid, polyisocyanurate foams which have both a high content of biobased materials and performance characteristics similar to existing foams made from petroleum-based raw materials.

SUMMARY OF THE INVENTION

Accordingly, the present invention provides rigid polyisocyanurate foams that are prepared using polyols derived from natural plant oils that have a high content of biobased material. These natural-oil polyols may be incorporated into rigid polyisocyanurate foams for use in metal composite panels, such as those used in wall or roof systems, in relatively high amounts and possess properties similar to foams produced by all-petroleum-based materials. The high biobased content may permit wall or roof insulation systems containing these foams to be considered for the U.S. Government's preferred procurement program.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, hydroxyl numbers, functionalities and so forth in the specification are to be understood as being modified in all instances by the term "about." Equivalent weights and molecular weights given herein in Daltons (Da) are number average equivalent weights and number average molecular weights, respectively, unless indicated otherwise.

The present invention provides a process for producing a rigid polyisocyanurate foam involving reacting at an isocyanate index of from 175 to 400, a polyisocyanate with at least one natural-oil polyol containing at least 35 wt. %, based on the weight of the polyol, of natural oil, having a hydroxyl number from 175 to 375 and a hydroxyl functionality of 2.0 to 2.8, in the presence of a blowing agent and optionally, in the presence of one or more of surfactants, flame retardants, pigments, catalysts and fillers, wherein the resulting foam has a renewable biobased content of at least 8% by weight. The foams provided by the inventive process possess properties similar to foams produced from petroleum-derived materials and may find use in wall insulation or other applications. The resulting high biobased content (>8%) may allow wall insulation systems containing these foams to be considered for the U.S. Government's preferred procurement program.

The present inventors also have found that those natural-oil polyol-containing polyurethane foams run at indices of less than 175 exhibit poor burn properties. Good burn properties are required by U.S. model building codes for many construction applications. To improve the burn properties of the foam, higher amounts of flame retardants may be added. However, flame retardant addition reduces the overall biobased content of the foam and may adversely impact foam properties.

As is apparent to those skilled in the art, polyisocyanurate ("PIR") foams have inherently good burn properties due to the formation of heat-stable trimer linkages and thus usually require less added flame retardants than polyurethane foams. Polyester polyols, which are usually a component of PIR foams, improve both the burn characteristics and friability of the resultant foam. The present inventors have replaced the conventional petroleum-based polyester polyols typically found in PIR foams with natural-oil polyols exhibiting similar hydroxyl functionality, hydroxyl number and primary hydroxyl groups. These natural-oil polyols were developed to mimic the structure of conventional polyester polyols typically used in PIR foams. Because the trimer linkages help to build strength in the foam, little, if any, additional cross-linking polyol is required to improve mechanical properties, which maximizes the biobased content of the foam. Surprisingly, the polyisocyanurate foams of the present invention have both good mechanical properties and good burn properties.

This increased biobased content is advantageous as §9002 of the Farm Security and Rural Investment Act ("FSRIA") of 2002 awards U.S. Government procurement preference to items having the highest content practical of biobased materials. Another unexpected advantage of the inventive process using natural-oil polyols lies in the extremely low viscosity of these polyols; often less than 2,000 centipoise, and in some cases as low as 150 centipoise at room temperature, as compared with viscosities of greater than 2,000 centipoise, and sometimes as high as 15,000 centipoise or more for conventional polyester polyols. Such reduced viscosity provides for the production of lower viscosity polyol blends, which in turn allows for easier blending of components, better foam processing and improved foaming behavior.

The polyisocyanurate foams produced by the inventive process contain a high amount of natural-oil polyol and have mechanical properties that are similar to those polyisocyanurate foams made from all-petroleum-based materials. The natural-oil polyols useful in the inventive process preferably have a hydroxyl number of 175 to 400, more preferably from 175 to 375 and a hydroxyl functionality of 2.0 to 3.5, more preferably from 2.0 to 2.8. The natural-oil polyols of the present invention may have hydroxyl numbers and hydroxyl functionalities in amounts ranging between any combination of these values, inclusive of the recited values.

Natural-oil polyols ("NOPs") may be produced from any of the naturally occurring oils including, but not limited to, canola oil, castor oil, coconut oil, corn oil, cottonseed oil, jatropha oil, linseed oil, olive oil, palm oil, palm kernel oil, peanut oil, poppy seed oil, soybean oil, sunflower oil, tall oil, tung oil, tallow, and mixtures thereof. Particularly preferred natural-oil polyols are those derived from soybeans.

Any of the known organic isocyanates, modified isocyanates or isocyanate-terminated prepolymers made from any of the known organic isocyanates may be used in the practice of the present invention, provided they possess an isocyanate functionality of at least 2.0. Suitable polyisocyanates include aromatic, aliphatic, and cycloaliphatic polyisocyanates and combinations thereof. Useful polyisocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydro-toluene diisocyanate and its isomers, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenylpropane-4,4'-diisocyanate; triisocyanates such as 2,4,6-toluene triisocyanate; and polyisocyanates such as 4,4'-dimethyl-diphenylmethane-2,2',5,5'-tetraisocyanate and the crude polymethylene polyphenylpolyisocyanates. Crude polymeric diphenylmethane diisocyanate (PMDI) or modified crude polymethylene polyphenylpolyisocyanates are preferred.

Catalysts for the formation of polyisocyanurates (i.e., trimerization catalysts) include metal-type catalysts, such as alkali metal carboxylates, metal alcoholates, metal phenolates and metal hydroxides, tertiary amines, quaternary ammonium salts, tertiary phosphines and phosphorus onium salts. These trimerization catalysts are often used in combination with other catalysts which promote the reaction of isocyanates with water and/or polyols to obtain a synergistic effect. Preferred catalysts for use in the present process are binary or ternary blends of tertiary amine, such as pentamethyldiethylenetriamine, dimethylcyclohexylamine or dimethylethanolamine and potassium organo-salts such as potassium octoate or potassium acetate.

Water and a low-boiling compound in combination are used as the blowing agent in the present invention. The low-boiling compound includes hydrocarbons such as isomers of butane, pentane and hexane; and low-boiling fluorine-containing compounds such as HFC-245fa, HFC-365mfc and HFC-134a used alone or in combination. Particularly preferred blowing agents for use in the present invention are cyclopentane, n-pentane, isopentane and mixtures thereof.

Additives such as surfactants (foam regulators), for example silicone-based foam stabilizers, and flame retardants optionally may be included in the foam forming mixtures in the inventive process.

A minor amount of a surfactant advantageously may be included to stabilize the foaming reaction mixture during the initial stages of polymerization and help regulate cell size and produce closed cells, which improves thermal insulation performance. Any suitable surfactant can be employed in the invention, including silicone/ethylene oxide/propylene oxide copolymers. Examples of surfactants useful in the present invention include those available from polyurethane raw material suppliers including Momentive Performance Materials, Air Products and Chemicals, Inc. and Evonik Industries. Other suitable surfactants are described in U.S. Pat. Nos. 4,365,024 and 4,529,745. Other less preferred surfactants include polyethylene glycol ethers of long chain alcohols, tertiary amine or alkanolamine salts of long chain alkyl acid sulfate esters, alkylsulfonic esters and alkylarylsulfonic acids. Such surfactants are employed in amounts sufficient to stabilize the foaming reaction mixture against collapse and prevent the formation of large and irregular cells.

Suitable flame retardants (as used herein the term also refers to smoke suppressants and other known combustion modifiers) include phosphonates, phosphites, and phosphates (such as dimethyl methylphosphonate, ammonium polyphosphate, and various cyclic phosphate and phosphonate esters, as well as, reactive oligomeric organophosphates having functionality greater than 1, known to those skilled in the art), halogen-containing compounds known in the art (such as brominated phthalic acid esters and other brominated aromatic and aliphatic compounds), melamine, antimony oxides (such as antimony pentoxide and antimony trioxide), zinc compounds (such as various known zinc borates), aluminum compounds (such as alumina trihydrate), magnesium compounds (such as magnesium hydroxide) and urea. The flame retardants useful in the inventive process preferably are from the family of halogenated phosphates and brominated aromatic compounds.

As used herein, the term "isocyanate index" refers to the quotient of the number of isocyanate groups divided by the number of isocyanate-reactive groups, multiplied by 100. The isocyanate index in the present process preferably is from 175 to 400, more preferably from 250 to 300, and most preferably from 270 to 310. The isocyanate index in the process of the present invention may be in an amount ranging between any combination of these values, inclusive of the recited values.

EXAMPLES

The present invention is further illustrated, but is not to be limited, by the following examples. All quantities given in "parts" and "percents" are understood to be by weight, unless otherwise indicated. The following materials were used in producing the polyurethane foams of the examples:

| | |
|---|---|
| POLYOL A | ortho phthalate-diethylene glycol based aromatic polyester polyol, having a hydroxyl number of about 240 mg KOH/g and a viscosity at 25° C. of about 3,500 centipoise, with a hydroxyl functionality of 2; |
| POLYOL B | a KOH-catalyzed, sucrose-initiated polyether polyol having a hydroxyl number of about 470 mg KOH/g, a viscosity at 25° C. of about 33,000 cps, a biobased content of 29.9% and a hydroxyl functionality of about 5; |
| NOP A | a KOH-catalyzed, glycerine/soybean oil-initiated polyether polyol (70% PO, 30% EO) having a vegetable oil content of about 45%, a hydroxyl number of about 210 mg KOH/g, a viscosity at 25° C. of about 132 cps, and a functionality of about 2, made according to copending US Ser. No. 11/713,898; |
| NOP B | a KOH-catalyzed, glycerine/soybean oil-initiated polyether polyol (100% EO) having a vegetable oil content of about 45%, a hydroxyl number of about 210 mg KOH/g, a viscosity at 25° C. of about 147 cps, and a functionality of about 2, made according to copending US Ser. No. 11/713,898; |
| NOP C | a KOH-catalyzed, sucrose/glycerine/soybean oil-initiated polyether polyol (18% PO, 82% EO) having a vegetable oil content of about 39%, a hydroxyl number of about 290 mg KOH/g, a viscosity at 25° C. of about 541 cps, and a functionality of about 3, made according to copending US Ser. No. 11/713,898; |

-continued

| | |
|---|---|
| NOP D | an imidazole-catalyzed, sucrose/glycerine/soybean oil-initiated polyether polyol (18% PO, 82% EO) having a vegetable oil content of about 39%, a hydroxyl number of about 290 mg KOH/g, a viscosity at 25° C. of about 549 cps, and a functionality of about 3, made according to copending US Ser. No. 11/713,898; |
| FLAME RETARDANT A | tris-(β-chloroisopropyl)phosphate; |
| FLAME RETARDANT B | 3,4,5,6-tetrabromo-1,2-benzene dicarboxylic acid mixed esters with diethylene glycol and propylene glycol; |
| SURFACTANT A | a silicone surfactant available from Evonik Industries as TEGOSTAB B-8465; |
| CATALYST A | a 70% by weight solution of potassium octoate in diethylene glycol; |
| CATALYST B | a proprietary tertiary amine catalyst available from Air Products as POLYCAT 43; |
| CATALYST C | pentamethyldiethylenetriamine (PMDETA); |
| ISOCYANATE A | a polymeric diphenylmethane diisocyanate having an NCO content of 30.6% and a Brookfield viscosity at 25° C. of 700 centipoise; and |
| BLOWING AGENT A | a 70/30 mixture of cyclopentane and isopentane. |

Comparative Example C1 and Examples 2-10

Polyisocyanurate foams were made from the parts by weight of the components listed below in the Tables. The polyols and other components were first combined and subsequently reacted with the isocyanate. These foams were prepared in the laboratory using hand mix procedures known to those skilled in the art.

Example C1 is a typical formulation for an ASTM E84 Class 1 foam used in building panels. In the examples, either one or both of the conventional polyols were replaced with natural-oil polyols. The catalyst levels were adjusted, if needed, to provide the desired gel times; the amount of isocyanate used was adjusted to provide the desired index; and the levels of water and pentane were adjusted to provide the desired amount of blowing, which directly affects foam density.

The key foam properties of density, k-factor, dimensional stability were generally comparable to those of the control foam, sometimes being slightly better, and sometimes slightly worse. The only property consistently had poorer values than the control system was compressive strength. However, the values that were obtained were generally greater than 20 lb/in$^2$, which would be considered acceptable in most applications.

TABLE I

| | Ex. C-1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| POLYOL A | 46.98 | — | — | — | — | — | — | — | — | — |
| POLYOL B | 15.56 | 15.46 | — | — | 14.65 | 15.37 | — | — | — | — |
| NOP A | — | 46.94 | 62.40 | 63.56 | — | — | — | — | — | — |
| NOP B | — | — | — | — | 46.38 | 46.12 | 64.53 | 64.53 | — | — |
| NOP C | — | — | — | — | — | — | — | — | 61.13 | — |
| NOP D | — | — | — | — | — | — | — | — | — | 61.13 |
| FLAME RETARDANT A | 13.23 | 13.21 | 13.21 | 13.37 | 12.95 | 12.94 | 13.22 | 13.43 | 13.80 | 13.80 |
| FLAME RETARDANT B | 3.23 | 3.14 | 3.22 | 3.20 | 3.22 | 3.20 | 3.24 | 3.30 | 3.41 | 3.41 |
| SURFACTANT A | 2.15 | 2.20 | 2.16 | 2.19 | 2.15 | 2.13 | 2.20 | 2.24 | 2.27 | 2.27 |
| CATALYST A | 1.61 | 1.66 | 1.62 | 1.72 | 1.46 | 1.46 | 1.01 | 1.09 | 1.00 | 1.00 |
| CATALYST B | 0.76 | 0.80 | 0.75 | 0.85 | 0.74 | 0.71 | 0.51 | 0.49 | 0.40 | 0.40 |
| CATALYST C | 0.21 | 0.19 | 0.25 | 0.20 | 0.19 | 0.19 | 0.21 | 0.19 | 0.10 | 0.10 |
| WATER | 0.32 | 0.28 | 0.29 | 0.28 | 0.29 | 0.28 | 0.27 | 0.29 | 0.29 | 0.29 |
| BLOWING AGENT A | 15.95 | 16.12 | 16.11 | 14.61 | 17.98 | 17.60 | 14.80 | 14.45 | 17.60 | 17.60 |
| Polyol. total | 100.00 | 100.00 | 100.00 | 100.00 | 100.00 | 100.00 | 100.00 | 100.00 | 100.00 | 100.00 |
| ISOCYANATE A | 152.5 | 139.9 | 115.3 | 122.5 | 142.1 | 141.7 | 113.1 | 119.5 | 154.5 | 154.5 |
| Calculated Index | 283 | 274 | 277 | 289 | 294 | 291 | 283 | 297 | 308 | 304 |
| Biobased content (wt. %) | 1.84 | 10.73 | 13.04 | 12.86 | 10.43 | 10.49 | 13.63 | 13.23 | 9.37 | 9.37 |
| Mechanical Properties: | | | | | | | | | | |
| Core foam density (pcf) | 2.72 | 2.79 | 2.71 | 2.69 | 2.76 | 3.19 | 2.73 | 2.91 | 3.14 | 3.10 |
| Overall foam density (pcf) | 2.91 | 3.08 | 3.12 | 3.04 | 2.92 | 3.38 | 3.02 | 3.11 | 3.28 | 3.37 |
| Compressive strength, @10%, perpendicular (psi) | 42.4 | 24.7 | 17.1 | 19.8 | 32.0 | 37.4 | 20.7 | 18.3 | 39.2 | 34.2 |
| k-Factor @75° F. (BTU-in/h-ft$^2$-° F.) | 0.161 | 0.160 | 0.165 | 0.169 | 0.160 | 0.161 | 0.158 | 0.159 | 0.164 | 0.163 |
| Dimensional Stability @ 7 days, (% Vol. Change) | | | | | | | | | | |
| At −30° C. | 0.2 | 0.2 | 0.0 | 0.3 | −0.2 | −0.2 | −0.1 | −0.1 | −0.3 | −0.4 |
| At 70° C. | 0.8 | 0.2 | 0.0 | 0.4 | −1.7 | −1.0 | −2.3 | −1.3 | −1.4 | −2.3 |
| At 70° C./100% Relative Humidity | 2.5 | 2.9 | −1.5 | 1.4 | −0.6 | 0.2 | −1.8 | −3.3 | −0.3 | −0.9 |

Comparative Example C-11 and Examples 12

Polyisocyanurate foams were made from the parts by weight of the components listed below in the Tables. The polyols and other components were first combined and subsequently reacted with the isocyanate. These foams were prepared using a high-pressure, meter-mix foam machine with a continuous double-belt laminator using a dwell time of three minutes.

Example C-11 is typical of an ASTM E84 Class 1 foam used in building panels. In Example 12, the conventional Polyol A, which in the control is the polyol present in the largest quantity, is replaced with NOP B. As the table shows, the results obtained for the two foams were very similar in most respects including gel time, overall density, core density, closed cell content, k-factor and dimensional stability. Additionally, both foams passed the ASTM E84 Class 1 Tunnel Burn Test (conducted by Intertek Testing of San Antonio, Tex.) by obtaining a flame spread result of less than 25 and smoke development result of less than 450. The only parameter in which the NOP-containing foam performed significantly poorer than the convention foam was in compressive strength. However, for a foam density of less than 2.7 lb/ft$^3$, a compressive strength of nearly 29 lb/in$^2$ is acceptable.

TABLE II

| | Ex. C-11 | Ex. 12 |
|---|---|---|
| POLYOL A | 49.21 | — |
| POLYOL B | 16.41 | 16.51 |
| NOP B | — | 49.52 |
| FLAME RETARDANT A | 13.80 | 13.75 |
| FLAME RETARDANT B | 3.41 | 3.40 |
| SURFACTANT A | 2.27 | 2.26 |
| CATALYST A | 1.73 | 0.94 |
| CATALYST B | 0.84 | 0.47 |
| CATALYST C | 0.20 | 0.11 |
| WATER | 0.29 | 0.30 |
| BLOWING AGENT A | 11.83 | 12.75 |
| Total polyol Blend | 100.00 | 100.00 |
| ISOCYANATE A | 155.1 | 144.7 |
| Calculated Index | 286 | 281 |
| Biobased content (wt. %) | 1.92 | 11.12 |
| Process Parameters: | | |
| Chemical temperatures: | | |
| Isocyanate (° F.) | 77 | 83 |
| Resin (° F.) | 84 | 81 |
| Mix Pressures: | | |
| Isocyanate (psi) | 2000 | 2000 |
| Resin (psi) | 2000 | 2000 |
| Laminator temperature (° F.) | 135 | 135 |
| Throughout (lb/min) | 35.0 | 40.0 |
| Line speed (ft/min) | 24.2 | 24.7 |
| Machine Reactivity: | | |
| Cream time (sec) | 10 | 11 |
| Gel time (sec) | 25 | 25 |
| Rise time (sec) | 35 | 39 |
| Mechanical Properties: | | |
| Overall foam density (pcf) | 2.75 | 2.67 |
| Core foam density (pcf) | 2.44 | 2.44 |
| Compressive strength, parallel @10% (psi) | 38.0 | 28.9 |
| Closed-cell content (%) | 87.9 | 87.6 |
| k-Factor @75° F. (BTU-in/h-ft$^2$-° F.) | 0.136 | 0.137 |
| Dimensional Stability @7 days, % Vol. Change: | | |
| At −30° C. | 0.1 | 0.2 |
| At 100° C. | −0.3 | 0.6 |
| At 70° C./100% Relative Humidity | 3.2 | 2.0 |
| ASTM E84 Tunnel Burn Test (Intertek Testing, San Antonio, TX) | | |
| Flame spread | <25 | <25 |
| Smoke developed | <450 | <450 |
| ASTM E84 Class 1 Rating | pass | pass |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for producing a rigid polyisocyanurate foam comprising reacting at an isocyanate index of from about 175 to about 400:
    a polyisocyanate; with
    at least one natural-oil polyol containing at least about 35 wt. %, based on the weight of the polyol, of soybean oil, having a hydroxyl number from 175 to 375, a hydroxyl functionality of about 2.0 to about 3.5 and a viscosity less than 2,000 centipoise at 25° C.;
    in the presence of a blowing agent consisting of water and at least one compound selected from the group consisting of isomers of butane, isomers of pentane and isomers of hexane;
    and optionally, in the presence of one or more of surfactants, flame retardants, pigments, catalysts and fillers
    wherein the resulting foam has a renewable bio-based content of least 8% by weight.

2. The process according to claim 1, wherein the polyisocyanate is selected from the group consisting of m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydro-toluene diisocyanate and its isomers, isophorone diisocyanate, dicyclohexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, 3,3'-dimethyl-diphenylpropane-4,4'-diisocyanate, 2,4,6-toluene triisocyanate, 4,4'-dimethyl-diphenylmethane-2,2',5,5'-tetraisocyanate and polymeric diphenylmethane diisocyanate (PMDI).

3. The process according to claim 1, wherein the polyisocyanate is polymeric diphenylmethane diisocyanate (PMDI).

4. The process according to claim 1, wherein the at least one natural-oil polyol contains at least about 40 wt. %, based on the weight of the polyol, of soybean oil.

5. The process according to claim 1, wherein the at least one natural-oil polyol contains at least about 45 wt. %, based on the weight of the polyol, of soybean oil.

6. The process according to claim 1, wherein at the least one natural-oil polyol has a viscosity at 25° C. of less than about 1000 cps.

7. The process according to claim 1, wherein the at least one natural-oil polyol has a viscosity at 25° C. of less than about 500 cps.

8. The process according to claim 1, wherein the at least one natural-oil polyol has a viscosity at 25° C. of less than about 200 cps.

9. The process according to claim 1, wherein the at least one natural-oil polyol has a hydroxyl number of about 200 to about 350 and a functionality of about 2.0 to about 2.5.

10. The process according to claim 1, wherein the blowing agent consists of a mixture of water, cyclopentane and isopentane.

11. The process according to claim 1, wherein the isocyanate index is from about 250 to about 350.

12. The process according to claim 1, wherein the isocyanate index is from about 270 to about 310.

13. The process according to claim 1, wherein said natural-oil polyol has a hydroxyl number of 175 to 375 and a functionality of about 2.0 to about 2.8.

* * * * *